United States Patent
Tsai (10) Patent No.: US 7,391,608 B2
(45) Date of Patent: Jun. 24, 2008

(54) DISK DRIVE FASTENING MECHANISM

(75) Inventor: Cheng-Yu Tsai, Taoyuan (TW)

(73) Assignee: Mitac International Corp., Taoyuan (TW)

( * ) Notice: Subject to any disclaimer, the term of this patent is extended or adjusted under 35 U.S.C. 154(b) by 397 days.

(21) Appl. No.: 11/341,479

(22) Filed: Jan. 30, 2006

(65) Prior Publication Data

US 2006/0171111 A1 Aug. 3, 2006

(30) Foreign Application Priority Data

Jan. 31, 2005 (TW) .............................. 94102951 A (51) Int. Cl.
G06F 1/16 (2006.01)
(52) U.S. Cl. .......................... 361/685; 345/163; 720/658
(58) Field of Classification Search .............. 360/97.02, 360/92.1; 345/163, 85; 720/630, 658; 369/30.86, 369/53.22; 361/679–387, 724–727
See application file for complete search history.

(56) References Cited

U.S. PATENT DOCUMENTS 6,088,222 A * 7/2000 Schmitt et al. .............. 361/686
6,122,173 A * 9/2000 Felcman et al. ............. 361/726
6,456,501 B1 * 9/2002 Rubenstein et al. ......... 361/759
2005/0248916 A1 * 11/2005 Huang ........................ 361/685

FOREIGN PATENT DOCUMENTS

| TW | 430238 | 4/2001 |
|---|---|---|
| TW | 486134 | 5/2002 |
| TW | 535044 | 6/2003 |

* cited by examiner

Primary Examiner—Hung V Duong
(74) Attorney, Agent, or Firm—Rabin & Berdo, P.C.

(57) ABSTRACT

A disk drive fastening mechanism includes a computer chassis, a first disk drive rack and a second disk drive rack. The computer chassis has a top cover and a base that are connectable to each other. The first disk drive rack including a first retaining set and second retaining set is located on the base for housing a first disk drive. The second disk drive rack is movably mounted onto the top surface of the first disk drive rack for housing a second disk drive, confined in the first dimension and second dimension by the first retaining set and the second retaining set, and confined in the third dimension by the top cover and the first disk drive rack. Hence the second disk drive can be installed on the computer chassis without using tools so as to save installation time and simplify operation.

21 Claims, 8 Drawing Sheets

DISK DRIVE FASTENING MECHANISM

CROSS-REFERENCE TO RELATED APPLICATIONS

This non-provisional application claims priority under 35 U.S.C. § 119(a) on Patent Application No(s). 94102951 filed in Taiwan, R.O.C. on Dec. 31, 2005, the entire contents of which are hereby incorporated by reference.

FIELD OF THE INVENTION.

The invention relates to a fastening mechanism for fastening a disk drive on a computer chassis, and particularly to a fastening mechanism that may be operated without using tools.

BACKGROUND OF THE INVENTION

The hardware of a computer system generally includes a host motherboard, various interface cards and magnetic disk drives (such as floppy disk drives, hard disk drives, optical disk drives and the like). This equipment is housed in a chassis, or a computer chassis. The computer chassis includes a case that has a housing space and a cover to seal the housing space. As the magnetic disk drives can be configured selectively, to facilitate installation and expansion, the computer chassis usually includes pre-configured disk drive frames to allow the disk drives to be installed or removed as desired.

At present fastening of the disk drives is mostly accomplished with fastening screws. That is, first load the disk drive in the frame already installed on the computer chassis; then fasten the disk drive to the frame through screws. Such a fastening method has disadvantages. For instance, during installation of the disk drive, workers on the production line have to use screw drivers to fasten the screws repeatedly. Production process is thus complicated and tedious. To improve production efficiency is difficult.

To remedy this problem, many disk drive fastening mechanisms have been developed to simplify the operation. One approach is to attach screws on the disk frame of the disk drive so that the disk drive can be fastened to the computer chassis by latching. But this still requires screw drivers for assembly and disassembly. Other references can be found in R.O.C. patent publication Nos. 430238, 486134 and 535044.

R.O.C. patent No. 430238 places two plates on two sides of the disk drive to serve as sliding tracks so that the disk drive can be loaded into the frame of the computer chassis by sliding without using screw drivers.

R.O.C. patent No. 486134 includes latching elements to latch an upper case and a lower case for housing a disk drive manually. The latching elements are connected to the upper case and inserted into apertures the lower case on corresponding positions. Hence the disk drive can be mounted onto the computer chassis without using screw drivers.

R.O.C. patent No. 535044 proposes a main frame with turnable fastening bolt and a fastening hook to be anchored by anchoring struts of the computer chassis so that the disk drive can be mounted on the computer chassis without using screw drivers.

SUMMARY OF THE INVENTION

In view of the aforesaid problems, the primary object of the invention is to provide a disk drive fastening mechanism to mount disk drives on a computer chassis without using tools such as screw drivers to save assembly time and simplify operation.

In order to achieve the foregoing object, the disk drive fastening mechanism according to the invention includes a computer chassis, a first disk drive rack and a second disk drive rack. The computer chassis includes a top cover and a base. The first disk drive rack is located on the base for housing a first disk drive, wherein the first disk drive rack includes a first retaining set and a second retaining set. The second disk drive rack is movably mounted onto the top surface of the first disk drive rack for housing a second disk drive, so that the second disk drive rack is confined by the first retaining set and the second retaining set in the first dimension and the second dimension. The second disk drive rack is further confined by the top cover and the first disk drive rack in the third dimension.

By the construction set forth above, the first disk drive and the second disk drive may be mounted on the computer chassis. Moreover, installation of the second disk drive can be done without hand tools.

In another aspect, the first disk drive rack may be dispensed with. The elements of the first disk drive rack may be formed directly on the base of the computer chassis. The elevation difference of the top cover and the base is the same as the height of the second disk drive rack to be held.

The foregoing, as well as additional objects, features and advantages of the invention will be more readily apparent from the following detailed description, which proceeds with reference to the accompanying drawings.

DESCRIPTION OF THE PREFERRED EMBODIMENTS

Refer to FIGS. 1, 2, 3, and 4 for a first embodiment of the disk drive fastening mechanism of the invention. It includes a computer chassis 10, a first disk drive rack 20 and a second disk drive rack 30.

The computer chassis 10 includes a top cover 11 and a base 12 that are connectable to each other. The base 12 has a first frame opening 121a and a second frame opening 121b.

The first disk drive rack 20 is located on the base 12 for housing a first disk drive 40, and the first frame opening 121a of the base 12 is used for loading the first disk drive 40. The first disk dive rack 20 includes a first top plate 21, two first side plates 22 and two fastening plates 23. The two first side plates 22 face to each other and respectively have one end connected to the first top plate 21 and the other end connected the fastening plates 23. The fastening plates 23 are fastened to the base 12.

The first top plate 21 has a first retaining set 211 and a second retaining set 212. The first retaining set 211 has a plurality of first retaining members 2111 in the first dimension corresponding to two opposite ends (left end and right end as shown in the drawings) of the second disk drive rack 30 (the bracket 31, which will be discussed later). The second retaining set 212 includes a detent section 2121 and a bucking section 2122, which are located in the second dimension corresponding to two opposite ends (the front end and the rear end as shown in the drawings) of the second disk drive rack 30 (the elastic reed 32, which will be discussed later).

Each of the first side plates 22 includes a plurality of first wedge members 221 corresponding to first apertures 41 formed on the first disk drive 40.

The fastening plate 23 has holes 231 for fastening elements 60 passing through and being fastened onto the base 12.

The second disk drive rack 30 is movably mounted onto the top surface of the first disk drive rack 20 for housing a second disk drive 50, and the second frame opening. 121*b* of the base 12 is used for loading the second disk drive 50. The second disk drive rack 30 includes a bracket 31 and an elastic reed 32. The bracket 31 is used for housing the second disk drive 50, and includes a second top plate 311 and two second side plates 312. The second top plate 311 has two ends connecting to the two second side plates 312. Each of the second side plates 312 has a plurality of second wedge members 3121 corresponding to second apertures 51 formed on the second disk drive 50. The bracket 31 is confined respectively by the first retaining set 21 1 and the top cover 11 in the first dimension and the first disk drive rack 20 in the third dimension. The elastic reed 32 is fastened to one end of the second side plate 312. The elastic reed 32 includes a detent member 321 confined by the second retaining set 212 in the second dimension. Thus in the first and second dimensions, the second disk drive rack 30 is confined respectively by the first retaining set 211 and the second retaining set 212. In the third dimension, the second disk drive rack 30 is confined by the top cover 11 and the first disk drive rack 20.

Refer to FIGS. 1, 2, 3, 4, 5A, 5B, 5C, and 5D for the structure and assembly operations of the first embodiment of the invention. First, place the first disk drive 40 in the first disk drive rack 20. The first wedge members 221 are able to be coupled with the first apertures 41 of the first disk drive 40 without using screws, since the first side plate 22 of the first disk drive rack 20 are elastic. Next, load the first disk drive 40 through the first frame opening 121*a*, fasten the first disk rack 20 and the first disk drive 40 onto the base 12 through the holes 231 of the fastening plates 23 with fastening elements 60 passing through.

Then place the second disk drive 50 in the second disk drive rack 30. The second wedge members 3121 are able to be coupled with the second apertures 51 of the second disk drive 50 without using screws, since the second side plates 312 of second disk drive rack 30 are elastic. Next, load the second disk drive rack 30 and the second disk drive 50 through the second frame opening 121*b* by sliding through the gap between the first retaining members 2111 until one end of the elastic reed 32 reaches the bucking section 2122 of the second retaining set 212, and the detent member 321 on another end of the elastic reed 32 is stopped by the detent section 2121. Thereby the second disk drive rack 30 is confined by the first retaining set 211 and the second retaining set 212 in the first and second dimensions.

Finally, the top cover 11 and the base 12 are connected to each other with the top cover 11 pressing the second disk drive rack 30. Thereby the second disk drive rack 30 is confined by the top cover 11 and the first disk drive rack 20 in the third dimension. Hence both the first disk drive 40 and the second disk drive 50 are fastened.

Thus, according to the second embodiment of the invention, the second disk drive 50 can be mounted onto the computer chassis 10 without using tools such as screw drivers. Assembly time may be reduced and operation is simpler.

Figure 1:
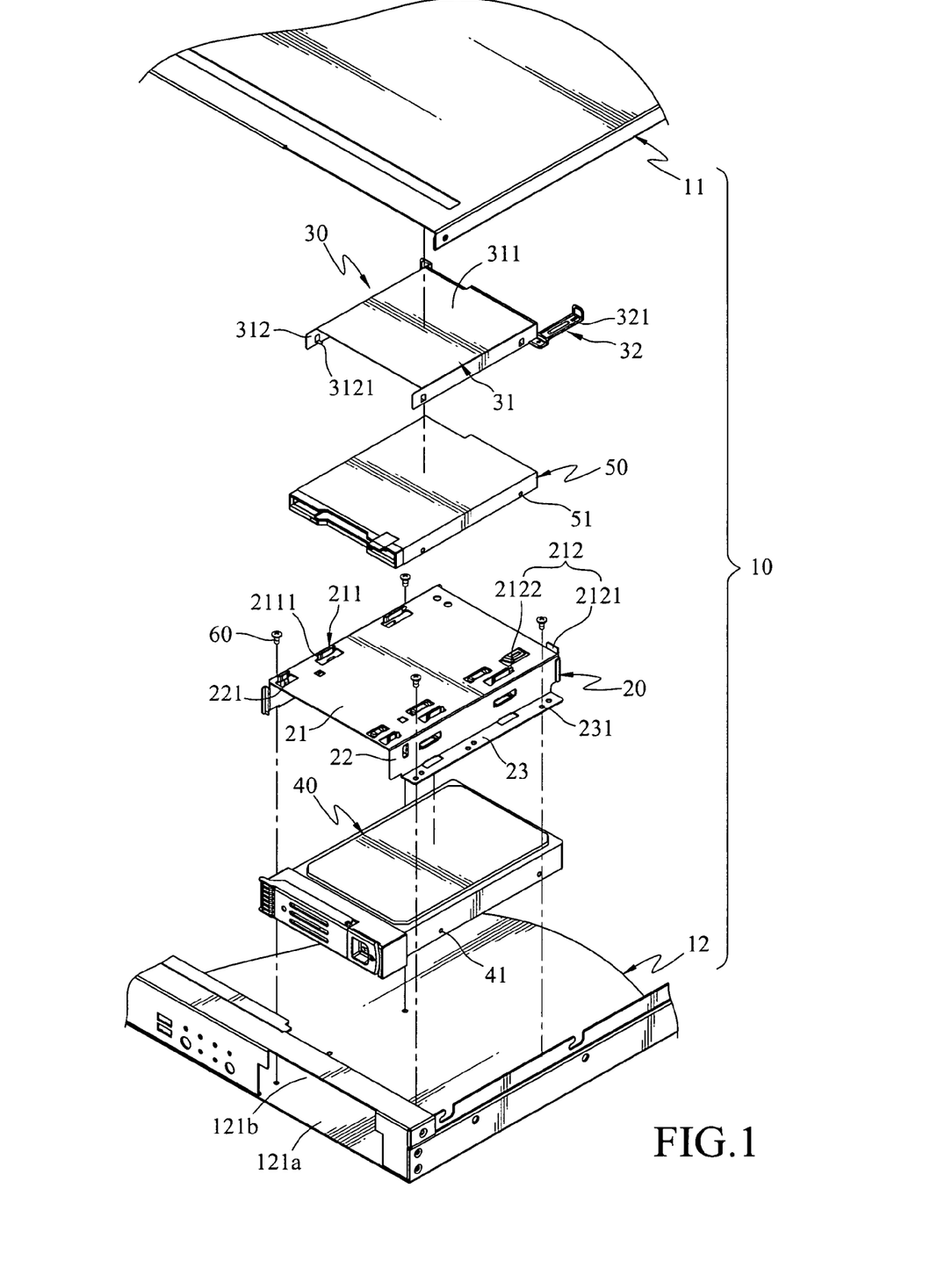
FIG. 1 is an exploded view of the invention.
Figure 2:
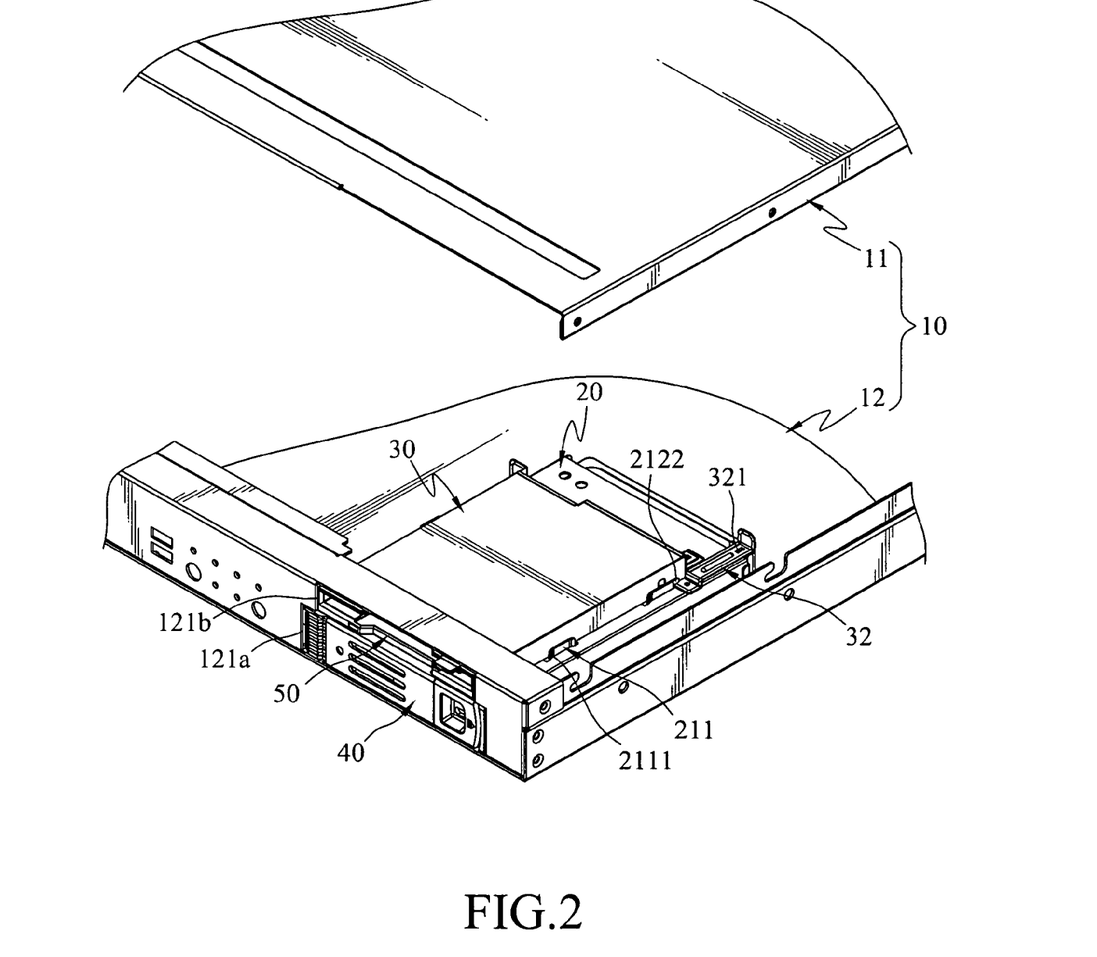
FIG. 2 is a fragmentary perspective view of a first embodiment of the invention.
Figure 3:
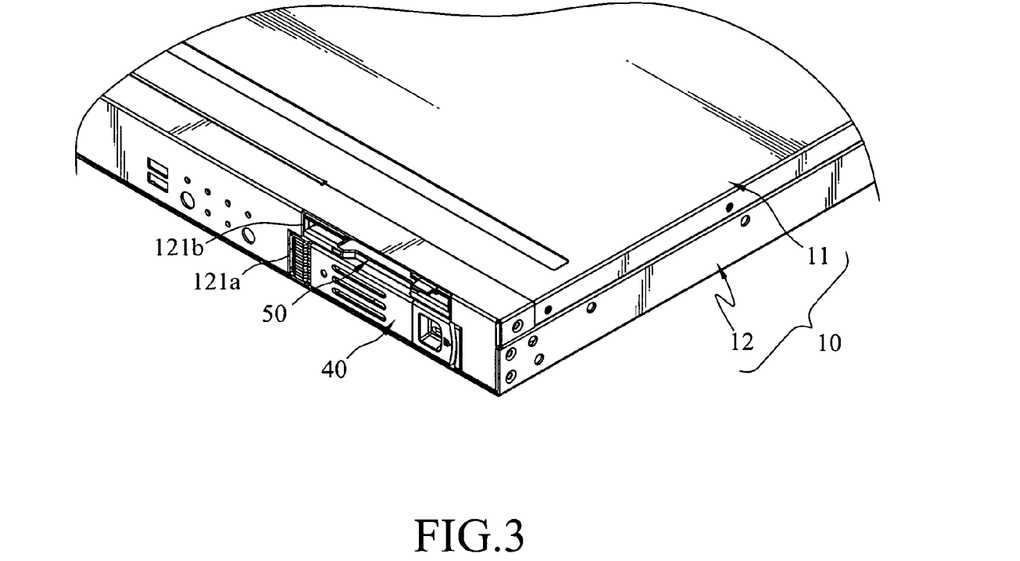
FIG. 3 is a perspective view of the first embodiment of the invention.
Figure 4:
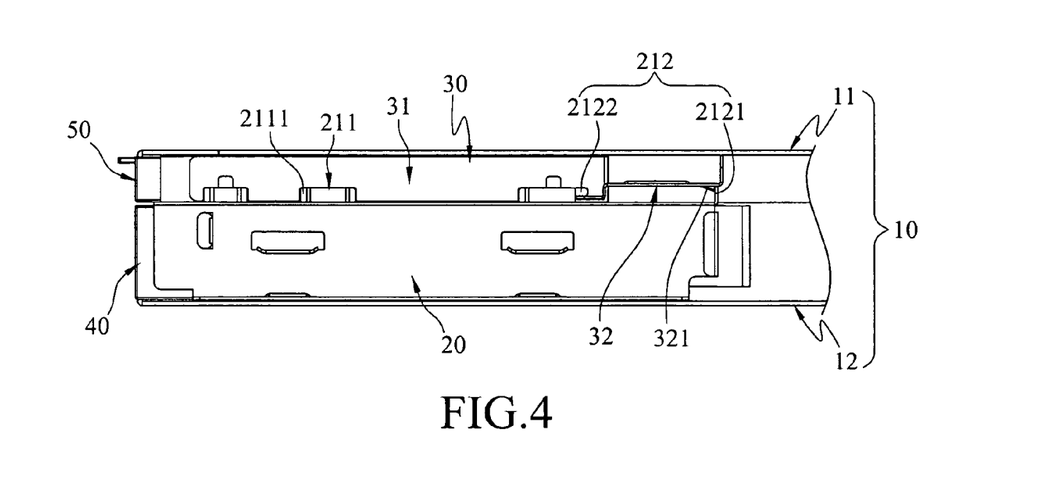
FIG. 4 is a sectional view of the first embodiment of the invention.
Figure 5A:
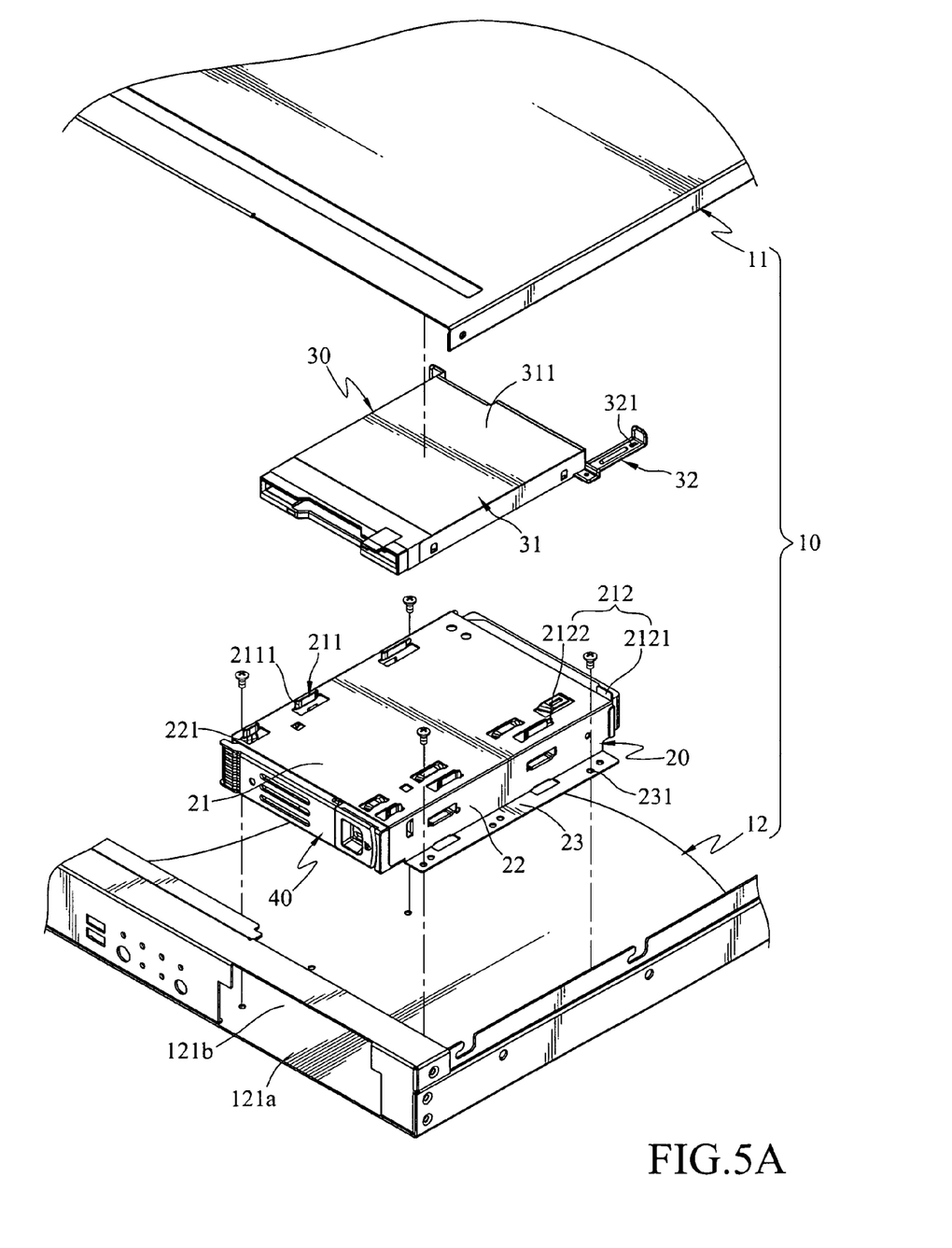
FIGS. 5A through 5D are schematic views of the first embodiment of the invention in assembly operations.
Figure 5B:
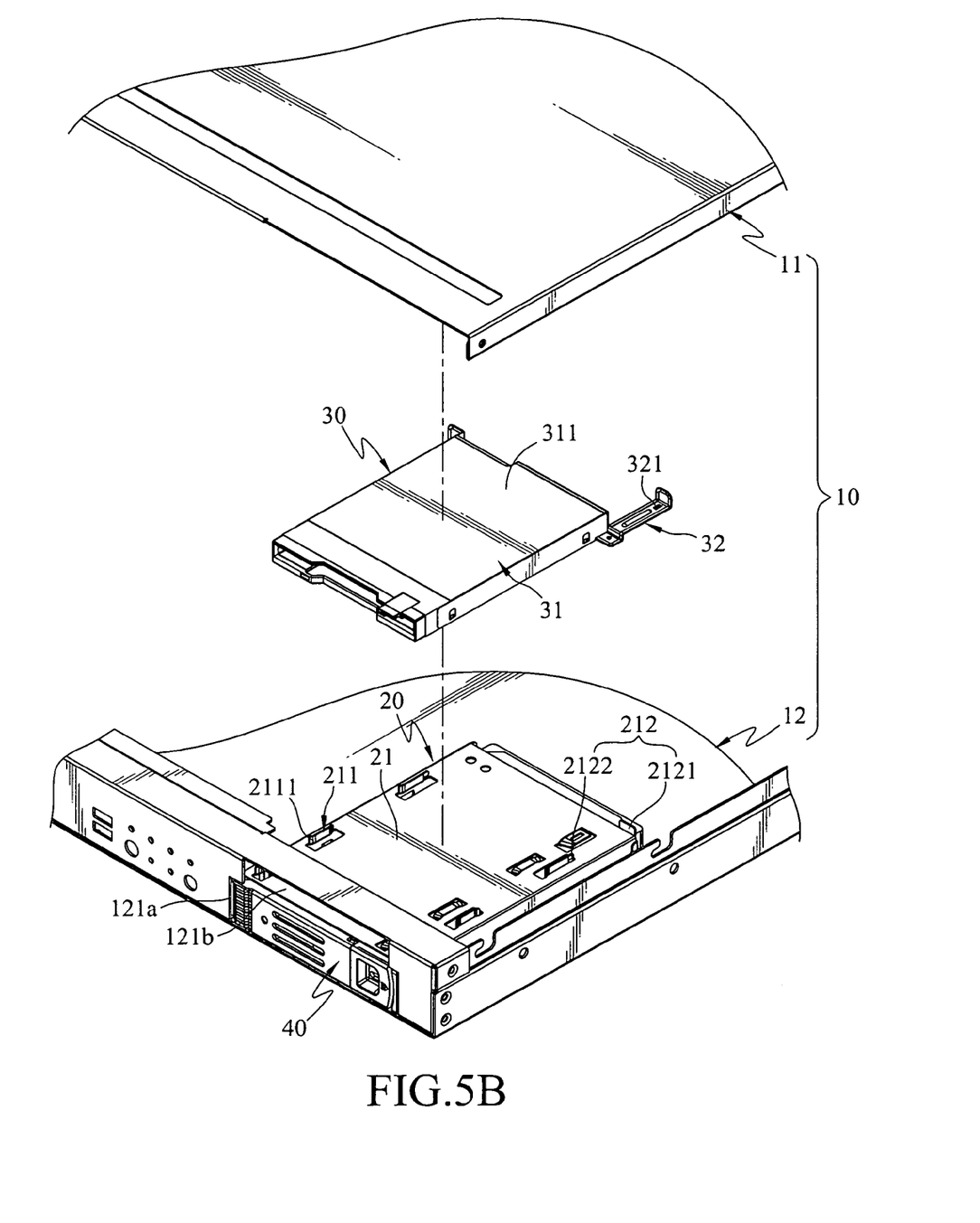
Figure 5C:
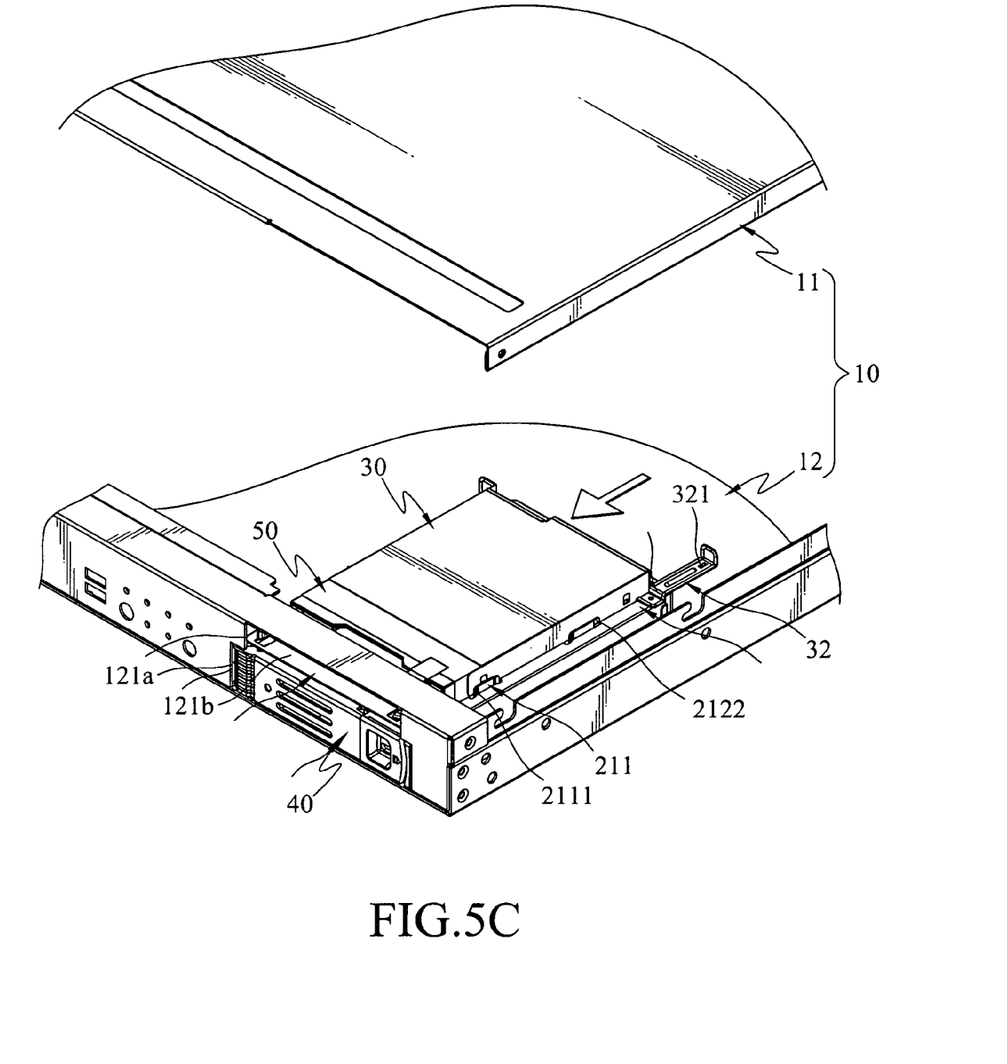
Figure 5D:
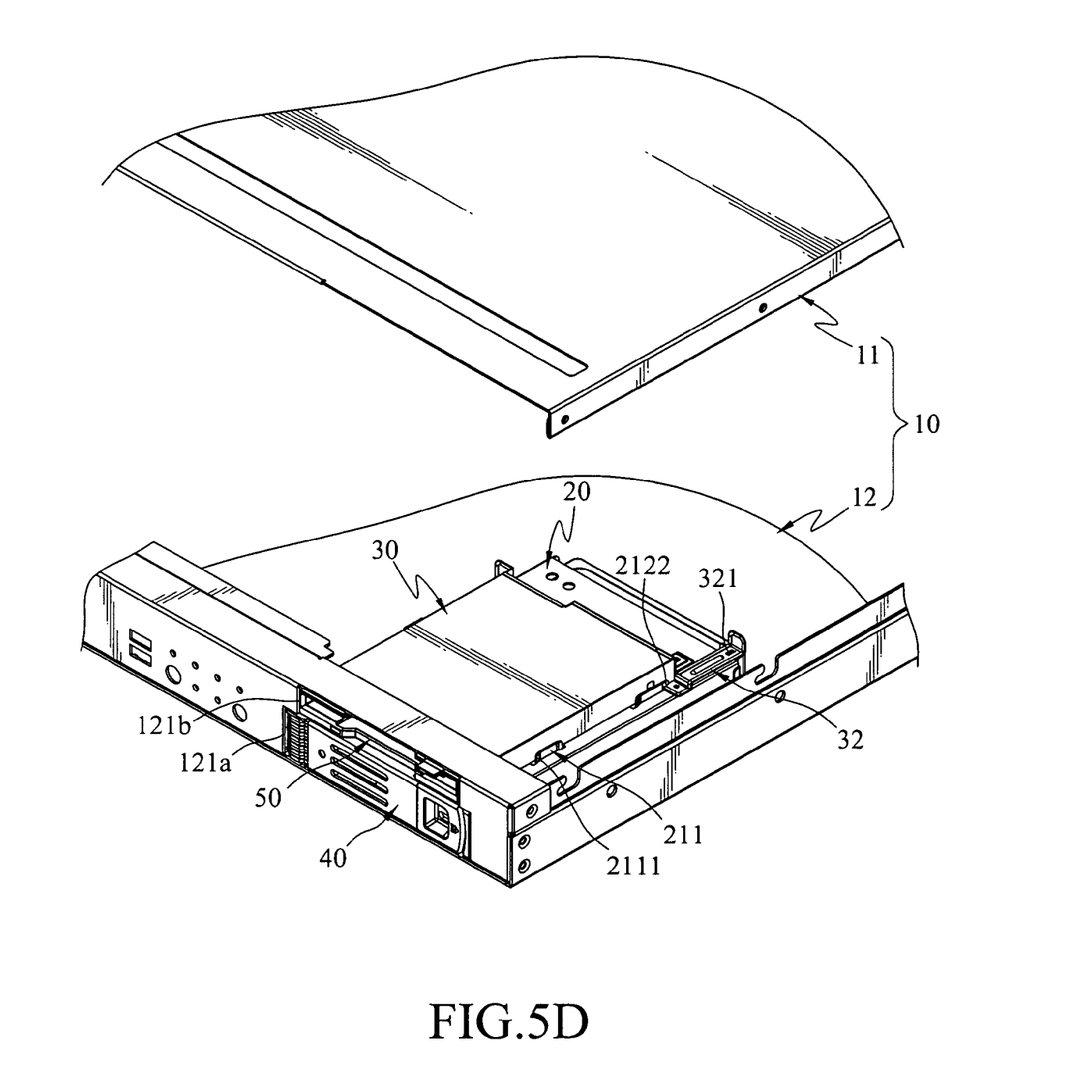
Figure 6:
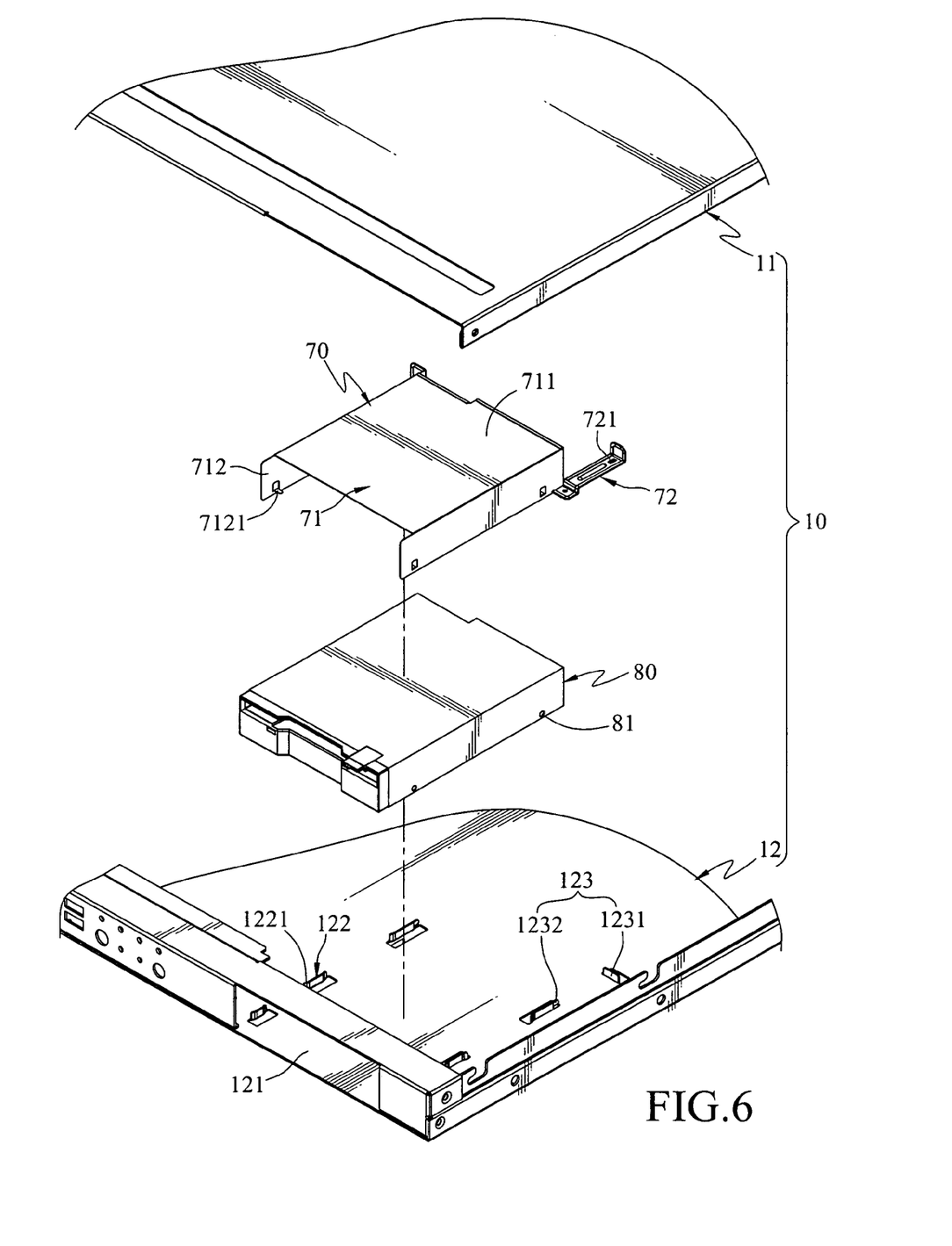
FIG. 6 is an exploded view of a second embodiment of the invention.

The first disk drive rack 20 in the first embodiment set forth above may be dispensed with. The elements except for the first disk drive rack 20 may be directly formed on the base 12 of the computer chassis 10. The elevation difference of the top cover 11 and the base 12 is the height of the second disk drive rack 30 to be held. Refer to FIG. 6 for the exploded view of a second embodiment of the invention.

For fastening a disk drive 80 in a disk drive rack 70, couple wedge members 7121 on sides plates 712 of a bracket 71 with apertures 81 formed on the disk drive 80; slide the disk drive rack 70 and the disk drive 80 between the gap of first retaining members 1221 of a first retaining set 122; load the disk drive 80 through a frame opening 121 until one end of an elastic reed 72 reaches a bucking section 1232 of a second retaining set 123 and another end of the. elastic reed 72 is pressed by a detent section 1231 of a detent member 721. Thereby the disk drive rack 70 is confined by the first retaining set 122 and the second retaining set 123 in the first and second dimensions.

Finally, the top cover 11 is connected to the base 12, with the top cover 11 pressing the disk drive rack 70. Thereby the disk drive rack 70 is confined by the top cover 11 and the base 12 in the third dimension to fasten the disk drive 80.

Thus, according to the second embodiment of the invention, the disk drive 80 can be installed on the computer chassis 10 without using hand tools such as screw drivers. Assembly time may be reduced and operation is simpler.

While the preferred embodiments of the invention have been set forth for the purpose of disclosure, modifications of the disclosed embodiments of the invention. as well as other embodiments thereof may occur to those skilled in the art. Accordingly, the appended claims are intended to cover all embodiments which do not depart from the spirit and scope of the invention.

What is claimed is:

1. A disk drive fastening mechanism, comprising:
   a computer chassis including a top cover and a base that are connectable to each other;
   a first disk drive rack located on the base for housing a first disk drive including a first retaining set and a second retaining set; and
   a second disk drive rack movably mounted onto a top surface of the first disk drive rack for housing a second disk drive, confined by the first retaining set and the second retaining set in a first dimension and a second dimension, and confined by the top cover and the first disk dive rack in a third dimension.

2. The disk drive fastening mechanism of claim 1, wherein the base has a first frame opening for loading the first disk drive therein.

3. The disk drive fastening mechanism of claim 1, wherein the base has a second frame opening for loading the second disk drive therein.

4. The disk drive fastening mechanism of claim 1, wherein the first disk drive rack comprises a first top plate, two first side plates faced to each other, and two fastening plates fastened onto the base.

5. The disk drive fastening mechanism of claim 4, wherein the two first side plates respectively have one end connected to the first top plate and the fastening plates.

6. The disk drive fastening mechanism of claim 4, wherein the fastening plates have holes for fastening elements passing through and being fastened onto the base.

7. The disk drive fastening mechanism of claim 1, wherein the first disk drive rack comprises a plurality of first wedge members corresponding to first apertures formed on the first disk drive.

8. The disk drive fastening mechanism of claim 7, wherein the first wedge members are coupled with the first apertures since the first disk drive rack is elastic.

9. The disk drive fastening mechanism of claim 1, wherein the first retaining set comprises a plurality of first retaining members in the first dimension corresponding to two opposite end of the second disk drive rack.

10. The disk drive fastening mechanism of claim 1, wherein the second disk drive rack comprises:
 a bracket used for housing the second disk drive and confined by the first retaining set, and the top cover and the first disk drive rack in the first dimension and the third dimension; and
 an elastic reed fastened to one end of the bracket, and the bracket being confined by the second retaining set in the second dimension.

11. The disk drive fastening mechanism of claim 10, wherein the elastic reed comprises a detent member confined by the second retaining set in the second dimension.

12. The disk drive fastening mechanism of claim 1, wherein the second disk drive rack comprises a plurality of second wedge members corresponding to second apertures formed on the second disk drive.

13. The disk drive fastening mechanism of claim 12, wherein the second wedge members are coupled with the second apertures since the second disk drive rack is elastic.

14. The disk drive fastening mechanism of claim 1, wherein the second retaining set comprises a detent section and a bucking section located in the second dimension on two opposite sides of the second disk drive rack.

15. A disk drive fastening mechanism, comprising:
 a computer chassis including a top cover and a base that are connectable to each other, the base including a first retaining set and a second retaining set; and
 a disk drive rack movably mounted onto base for housing a disk drive, confined by the first retaining set and the second retaining set in a first dimension and a second dimension, and confined by the top cover and the base in a third dimension.

16. The disk drive fastening mechanism of claim 15, wherein the base has a frame opening for loading the disk drive therein.

17. The disk drive fastening mechanism of claim 15, wherein the first retaining set comprises a plurality of first retaining members located in the first dimension corresponding to two opposite ends of the disk drive rack.

18. The disk drive fastening mechanism of claim 15, wherein the disk drive rack comprises:
 a bracket used for housing the disk drive and confined by the first retaining set, and the top cover and the base in the first dimension and the third dimension; and
 an elastic reed fastened to one end of the bracket, and the bracket being confined by the second retaining set in the second dimension.

19. The disk drive fastening mechanism of claim 18, wherein the elastic reed comprises a detent member confined by the second retaining set in the second dimension.

20. The disk drive fastening mechanism of claim 15, wherein the disk drive rack comprises a plurality of wedge members corresponding to apertures formed on the disk drive.

21. The disk drive fastening mechanism of claim 15, wherein the second retaining set comprises a detent section and a bucking section located in the second dimension corresponding to two opposite ends of the disk drive rack.

* * * * *